US012762831B2

(12) United States Patent
Case et al.

(10) Patent No.: US 12,762,831 B2
(45) Date of Patent: Oct. 13, 2026

(54) SYSTEMS AND METHODS FOR GENERATING SYNTHETIC SATELLITE IMAGE TRAINING DATA FOR MACHINE LEARNING MODELS

(71) Applicant: The MITRE Corporation, McLean, VA (US)

(72) Inventors: Robert A. Case, McLean, VA (US); Joseph Jubinski, McLean, VA (US); Dasith A. Gunawardhana, McLean, VA (US); Melvin H. Dedicatoria, McLean, VA (US); Richard W. Huzil, McLean, VA (US); Ransom Winder, McLean, VA (US)

(73) Assignee: The MITRE Corporation, McLean, VA (US)

( * ) Notice: Subject to any disclaimer, the term of this patent is extended or adjusted under 35 U.S.C. 154(b) by 730 days.

(21) Appl. No.: 18/119,152

(22) Filed: Mar. 8, 2023

(65) Prior Publication Data

US 2023/0290110 A1 Sep. 14, 2023

Related U.S. Application Data

(60) Provisional application No. 63/318,253, filed on Mar. 9, 2022.

(51) Int. Cl.

*G06V 10/70* (2022.01)
*G06T 5/50* (2006.01)
*G06T 7/12* (2017.01)

(52) U.S. Cl.

CPC ................ *G06V 10/70* (2022.01); *G06T 5/50* (2013.01); *G06T 7/12* (2017.01); *G06T 2207/20016* (2013.01); *G06T 2207/20132* (2013.01)

(58) Field of Classification Search

CPC .... G06V 10/70; G06V 10/772; G06V 20/176; G06V 10/774; G06V 10/82; G06V 20/13;

(Continued)

(56) References Cited

U.S. PATENT DOCUMENTS 6,304,245 B1 * 10/2001 Groenenboom ....... H04N 5/272 345/611
8,838,511 B2 9/2014 Kristal et al.

(Continued)

FOREIGN PATENT DOCUMENTS

KR 20210065685 A * 6/2021 ............ G06N 3/045

OTHER PUBLICATIONS

Libbi, C. et al. (May 2021). "Generating Synthetic Training Data forSupervised De-Identification of Electronic Health Records," Future Internet 13(4): 24 pages.

(Continued)

*Primary Examiner* — John B Strege
(74) *Attorney, Agent, or Firm* — Morrison & Foerster LLP

(57) ABSTRACT

Presented herein are systems and methods for generating synthetic training data for machine learning models. Images of a particular object (such as an aircraft) can be received and processed to cutout the object (i.e., separate the object from the background) from the received image. The systems and methods described herein can detect areas in the background images to place an object. Once a suitable area has been detected, the cutout object image can be superimposed on the background image at the location determined to be suitable for placing the object. Superimposing the object onto the background image can include blending the two images using a plurality of blending techniques to reduce artifacts that may bias a supervised training process.

36 Claims, 10 Drawing Sheets

(58) Field of Classification Search
CPC ... G06T 5/50; G06T 2207/20016; G06T 7/12; G06T 2207/20132; G06T 11/00
See application file for complete search history.

(56) References Cited

U.S. PATENT DOCUMENTS

| | | | | |
|---|---|---|---|---|
| 9,349,105 | B2 | 5/2016 | Beymer et al. | |
| 9,691,161 | B1 * | 6/2017 | Yalniz | G06T 7/11 |
| 9,785,719 | B2 | 10/2017 | Ma et al. | |
| 10,860,836 | B1 * | 12/2020 | Tyagi | G06V 10/454 |
| 2002/0114010 | A1 * | 8/2002 | Haltmaier | H04N 1/40062<br>382/199 |
| 2014/0071149 | A1 * | 3/2014 | Chu | G06F 3/14<br>345/589 |
| 2016/0358360 | A1 * | 12/2016 | Wildey | G06T 3/40 |
| 2020/0134377 | A1 * | 4/2020 | Attorre | G06V 10/82 |

OTHER PUBLICATIONS

Oneview "Combining Synthetic Data with Real Data to Improve Detection Results in Satellite Imagery: Case Study," located at https://one-view.ai/combining-synthetic-data-with-real-data-to-improve-detection-results-in-satellite-imagery-case-study/, visited on Aug. 6, 2021. (12 pages).

Pnvr, K. "SharinGAN: Combining Synthetic and Real Data for Unsupervised Geometry Estimation," CVPR, Jun. 14-19, 2020; pp. 13974-19383.

Whitfield, D. "The Magic of Synthetic Data. Using Artificial Intelligence to Train Artificial Intelligence with GPT-2," located at https://towardsdatascience.com/the-magic-of-synthetic-data-using-artificial-intelligence-to-train-artificial-intelligence-with-cebe0d50a411, visited on Aug. 6, 2021. (17 pages).

* cited by examiner

800

SYSTEMS AND METHODS FOR GENERATING SYNTHETIC SATELLITE IMAGE TRAINING DATA FOR MACHINE LEARNING MODELS

CROSS REFERENCE TO RELATED APPLICATIONS

This application claims the benefit of U.S. Provisional Application No. 63/318,253, filed Mar. 9, 2022, the entire contents of which is incorporated herein by reference.

FIELD OF THE DISCLOSURE

This disclosure relates to synthetic training data for machine learning models, and more specifically, to generating synthetic satellite imagery training data for machine learning models used in object detection in satellite images.

BACKGROUND OF THE DISCLOSURE

Machine learning classifiers can be useful tools for analyzing large data sets to determine whether the data set includes certain objects or characteristics. For instance, in an image analysis context, machine learning classifiers can be used to analyze images to determine whether any particular image possesses various characteristics. Rather than having a human manually analyze each image, a machine learning classifier can be used to quickly analyze an image and determine whether the image contains characteristics or properties of interest with minimal human intervention, thus saving time and effort.

While using a machine learning classifier to detect characteristics/properties within a data set can overall reduce human effort and time, the process of generating a machine learning classifier can require significant training data to make the machine learning model effective at the task it was designed to do. A machine learning classifier is only as good as the training data used to train it. If a machine learning classifier is under-trained (i.e., provided too few examples of characteristics in data) then the accuracy of the classifier may be unacceptably low.

Many machine learning classifiers are generated using a supervised training process in which a classifier is given a large set of training data that has been annotated with the properties/characteristics found within the data, so that the classifier can then "learn" how to find those characteristics/properties in other data sets in which the properties and/or characteristics of the data are not known a priori. In order to make a machine learning classifier/model accurate, the training process should include a large number of data sets with diverse characteristics, so that the machine learning model can learn to detect characteristics in the data set in a variety of contexts.

Object detection in satellite imagery has been an important application of machine learning technology. Machine learning models can be used to detect a variety of objects in satellite images. In contrast to a human manually examining images one at a time to look for certain objects, a machine learning model can process thousands of images and automatically detect objects in the images in a short amount of time. However, providing a robust training data set to a machine learning classifier can present a challenge in the context of satellite imagery. As described above, generating an accurate machine learning model requires a large volume of training data. However, in the context of satellite imagery, such volume might not exist, since the universe of satellite images available for training may be constrained. Furthermore, if the object to be detected is not found in abundance (i.e., such as a particular aircraft), this may make finding training data for a machine learning class even more difficult.

SUMMARY OF THE DISCLOSURE

Presented herein are systems and methods for generating synthetic training data for machine learning models according to examples of the disclosure. In one or more examples, images of a particular object (such as an aircraft) can be received and processed so as to cutout the object (i.e., separate the object from the background) from the received image. In the example of when aircrafts are the object of interest, the images can come from a variety of sources such as existing satellite imagery, CAD models, and images of scale models of aircraft.

In one or more examples, a plurality of background images (i.e., terrain images) can also be received. In the context of aircraft, in one or more examples, the background images can include satellite images of terrain where an aircraft might be found. In one or more examples, the background images can be processed and analyzed to determine areas on the background images where an object (i.e., aircraft) should not be placed. In one or more examples, the systems and methods described herein can detect areas in the background images to place an object. Once a suitable area has been detected, in one or more examples, the cutout object image can be superimposed on the background image at the location determined to be suitable for placing the object. In one or more examples, superimposing the object onto the background image can include blending the two images using a plurality of blending techniques to reduce artifacts that may bias a supervised training process.

In one or more examples, the object images and the background images can be used to generate synthetic training images for use in a supervised training process for generating a machine learning classifier. In one or more examples, the cutout object and the terrain can be normalized to one another to account for any disparities in the colors and resolution of the images. In one or more examples, normalization can include mapping both the object image and the background image to a common color map. In one or more examples, normalization can also include matching the resolution between the object image and the terrain image.

In one or more examples, detecting areas in a background image to exclude placement of an object can include using one or more machine learning classifiers to detect one or more objects in an image. In one or more examples, the detection could additionally or alternatively include thresholding the background image and using the resultant halftone image to determine the presence or absence of objects that could potentially "collide" with an object, if the object image is superimposed onto the background image. In one or more examples, superimposing an object cutout image onto a background image can include blending the object cutout and background image with one another using blending techniques such as: color channel blending, alpha channel blending, edge blurring, white balancing, random combination blending, and other techniques. In one or more examples, the techniques above could be applied at random so as to further diversify the set of synthetic training images to thereby produce a robust classifier. In one or more examples, once the object and background have been superimposed on one another, the resultant image can be annotated so as to be used as part of a supervised training process for a machine learning model.

In one or more examples, a method for generating synthetic training images configured to train a machine learning classifier to detect the presence of one or more objects in an image comprises: receiving a plurality of object images, wherein each object image of the plurality of object images comprises an object to be identified by the machine learning classifier, segmenting the image of the object from each object image of the plurality of object images to generate a plurality of cutout object images, receiving a plurality of background images, mapping a first cutout object image of the plurality of cutout object images and a first background image of the plurality of background images to a common color map, determining a placement area of the first background image to place the first cutout object image upon, superimposing the first cutout object image onto the determined placement area of the first background image to generate a first synthetic training, and annotating the generated first synthetic training image with a location of the superimposed first cutout object image on the generated synthetic training image.

Optionally, segmenting the image of the object from each object image of the plurality of object images comprises: cropping each object image to remove a portion of the object image in which the image of the object is not found, detecting one or more contours in the cropped image, and segmenting the image based on the detected one or more contours.

Optionally, wherein detecting one or more contours in the cropped image comprises determining an area of the cropped image that are outside the detected one or more contours, and modifying one or more pixels within the determine area of the cropped image that are outside the detected one or more contours so that they appear to be transparent.

Optionally, mapping a first cutout object image of the plurality of cutout object images and a first background image of the plurality of background images to a common color map comprises mapping the first cutout object image and the first background image to an International Color Consortium (ICC) color map.

Optionally, the method further comprises normalizing a resolution of the first cutout object image and normalizing a resolution of the first background image to a common image resolution.

Optionally, determining a placement area of the first background image to place the first cutout object image upon comprises generating a half-tone representation of the first background image.

Optionally, generating a half-tone image of the first background image comprises: determining an average pixel value of the background image, selecting one or more pre-determined thresholds based on the determined average pixel value of the background image, and setting a pixel value of the background image to a first value or a second value based on a relationship between the pixel value and the selecting one or more pre-determined thresholds.

Optionally, determining a placement area of the first background image comprises determining the location of one or more groups pixels in the half-tone image large enough to accommodate a size of the first cutout object image.

Optionally, superimposing the first cutout object image onto the determined placement area of the first background image to generate a first synthetic training image comprises blending the first cutout object image with the background image at the determined placement area to generate the first synthetic training image.

Optionally, blending the first cutout object image with the background image comprises applying a decoding auto encoder (DAE) to the generated first synthetic training image.

Optionally, blending the first cutout object image with the background image comprises applying one or more blending techniques selected from the group consisting of: alpha channel blending, color channel blending, white balancing, and edge blurring.

Optionally, the method comprises: generating a second synthetic training image from a second cutout object image and a second background image; and applying a blending technique to the second synthetic training image that is different than the blending technique applied to the first synthetic training image.

In one or more examples, a system for generating synthetic training images configured to train a machine learning classifier to detect the presence of one or more objects in an image comprises: a memory, one or more processors, wherein the memory stores one or more programs that when executed by the one or more processors, cause the one or more processors to: receive a plurality of object images, wherein each object image of the plurality of object images comprises an object to be identified by the machine learning classifier, segment the image of the object from each object image of the plurality of object images to generate a plurality of cutout object images, receive a plurality of background images, map a first cutout object image of the plurality of cutout object images and a first background image of the plurality of background images to a common color map, determine a placement area of the first background image to place the first cutout object image upon, superimpose the first cutout object image onto the determined placement area of the first background image to generate a first synthetic training, and annotate the generated first synthetic training image with a location of the superimposed first cutout object image on the generated synthetic training image.

Optionally, segmenting the image of the object from each object image of the plurality of object images comprises: cropping each object image to remove a portion of the object image in which the image of the object is not found, detecting one or more contours in the cropped image, and segmenting the image based on the detected one or more contours.

Optionally, wherein detecting one or more contours in the cropped image comprises determining an area of the cropped image that are outside the detected one or more contours, and modifying one or more pixels within the determine area of the cropped image that are outside the detected one or more contours so that they appear to be transparent.

Optionally, mapping a first cutout object image of the plurality of cutout object images and a first background image of the plurality of background images to a common color map comprises mapping the first cutout object image and the first background image to an International Color Consortium (ICC) color map.

Optionally, the method further comprises normalizing a resolution of the first cutout object image and normalizing a resolution of the first background image to a common image resolution.

Optionally, determining a placement area of the first background image to place the first cutout object image upon comprises generating a half-tone representation of the first background image.

Optionally, generating a half-tone image of the first background image comprises: determining an average pixel value of the background image, selecting one or more pre-determined thresholds based on the determined average pixel value of the background image, and setting a pixel value of the background image to a first value or a second value based on a relationship between the pixel value and the selecting one or more pre-determined thresholds.

Optionally, determining a placement area of the first background image comprises determining the location of one or more groups pixels in the half-tone image large enough to accommodate a size of the first cutout object image.

Optionally, superimposing the first cutout object image onto the determined placement area of the first background image to generate a first synthetic training image comprises blending the first cutout object image with the background image at the determined placement area to generate the first synthetic training image.

Optionally, blending the first cutout object image with the background image comprises applying a decoding auto encoder (DAE) to the generated first synthetic training image.

Optionally, blending the first cutout object image with the background image comprises applying one or more blending techniques selected from the group consisting of: alpha channel blending, color channel blending, white balancing, and edge blurring.

Optionally, the method comprises: generating a second synthetic training image from a second cutout object image and a second background image; and applying a blending technique to the second synthetic training image that is different than the blending technique applied to the first synthetic training image.

In one or more examples, a non-transitory computer readable storage medium storing one or more programs for generating synthetic training images configured to train a machine learning classifier to detect the presence of one or more objects in an image, comprises programs for execution by one or more processors of an electronic device that when executed by the device, cause the device to: receive a plurality of object images, wherein each object image of the plurality of object images comprises an object to be identified by the machine learning classifier, segment the image of the object from each object image of the plurality of object images to generate a plurality of cutout object images, receive a plurality of background images, map a first cutout object image of the plurality of cutout object images and a first background image of the plurality of background images to a common color map, determine a placement area of the first background image to place the first cutout object image upon, superimpose the first cutout object image onto the determined placement area of the first background image to generate a first synthetic training, and annotate the generated first synthetic training image with a location of the superimposed first cutout object image on the generated synthetic training image.

Optionally, segmenting the image of the object from each object image of the plurality of object images comprises: cropping each object image to remove a portion of the object image in which the image of the object is not found, detecting one or more contours in the cropped image, and segmenting the image based on the detected one or more contours.

Optionally, wherein detecting one or more contours in the cropped image comprises determining an area of the cropped image that are outside the detected one or more contours, and modifying one or more pixels within the determine area of the cropped image that are outside the detected one or more contours so that they appear to be transparent.

Optionally, mapping a first cutout object image of the plurality of cutout object images and a first background image of the plurality of background images to a common color map comprises mapping the first cutout object image and the first background image to an International Color Consortium (ICC) color map.

Optionally, the method further comprises normalizing a resolution of the first cutout object image and normalizing a resolution of the first background image to a common image resolution.

Optionally, determining a placement area of the first background image to place the first cutout object image upon comprises generating a half-tone representation of the first background image.

Optionally, generating a half-tone image of the first background image comprises: determining an average pixel value of the background image, selecting one or more pre-determined thresholds based on the determined average pixel value of the background image, and setting a pixel value of the background image to a first value or a second value based on a relationship between the pixel value and the selecting one or more pre-determined thresholds.

Optionally, determining a placement area of the first background image comprises determining the location of one or more groups pixels in the half-tone image large enough to accommodate a size of the first cutout object image.

Optionally, superimposing the first cutout object image onto the determined placement area of the first background image to generate a first synthetic training image comprises blending the first cutout object image with the background image at the determined placement area to generate the first synthetic training image.

Optionally, blending the first cutout object image with the background image comprises applying a decoding auto encoder (DAE) to the generated first synthetic training image.

Optionally, blending the first cutout object image with the background image comprises applying one or more blending techniques selected from the group consisting of: alpha channel blending, color channel blending, white balancing, and edge blurring.

Optionally, the method comprises: generating a second synthetic training image from a second cutout object image and a second background image; and applying a blending technique to the second synthetic training image that is different than the blending technique applied to the first synthetic training image.

BRIEF DESCRIPTION OF THE FIGURES

The invention will now be described, by way of example only, with reference to the accompanying drawings, in which.

DETAILED DESCRIPTION OF THE DISCLOSURE

Figure 1:
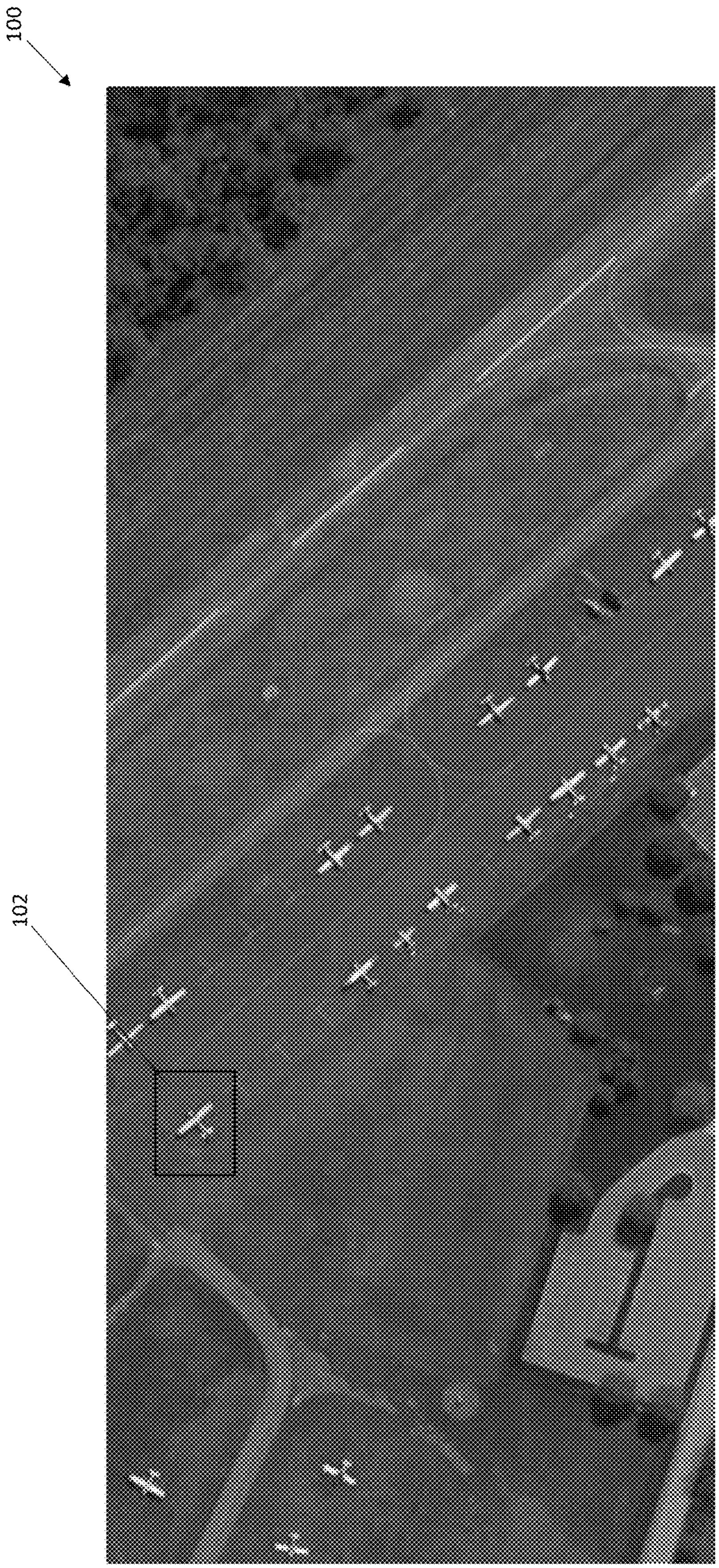
FIG. 1 illustrates an exemplary satellite image to be used for training a machine learning model according to examples of the disclosure.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Described herein are systems and methods for generating synthetic satellite training images for use is training a machine learning classifier according to examples of the disclosure. In one or more examples, a plurality of images containing an object of interest can be received. Such objects of interest can include, for example, aircraft (such as an airplane or helicopter), cars, trucks, boats, tanks, artillery, weapons, etc. The present disclosure uses aircraft as an example, but the disclosure should not be seen as limiting, and the systems and methods described herein can be applied to any type of object. In one or more examples, the received images can be acquired from a combination of satellite images, CAD models, and scale model imagery and include images of objects (i.e., aircraft) that can be used to generate synthetic data. In or more examples, the aircraft can be "cutout" from the received images. In one or more examples, cutting out the aircraft from the received image can include extracting bounding boxes from the image, detecting one or more contours in the image, and then segmenting the image based on the detected contours and the extracted bounding boxes from the image. In one or more examples, the segmented portion of the image can be the object of interest for generating the synthetic training data for the machine learning classifier.

In one or more examples, the process for generating synthetic training data can include receiving one or more background images. In one or more examples, the background images can be used as the background to place the segmented objects upon thus creating the synthetic training image. In one or more examples, both the background images as well as the segmented object images can be normalized with respect to one another. In one or more examples, normalization can include decompression of both images, color mapping each image to the other, and normalizing the resolution of each image. In one or more examples, once the images have been normalized to one another, the background image can be further processed to detect object in the image that should be avoided when attempting to superimpose the object onto the background. In one or more examples, object detection can include thresholding the background image to determine the presence of objects in the image.

In one or more examples, once the background image has been processed to detect for objects, the segmented object image can be superimposed onto the background image in a location that avoids any of the objects detected on the background image. In one or more examples, superimposing the object image onto the background image can include searching for a suitable area in the background image that is large enough to accommodate the segmented object image, placing the object onto the background image and the blending the two images together to form a single image. In one or more examples, once the images have been blended, the newly created synthetic image can be annotated with the location of the object for the purposes of providing annotated training data to a machine learning classifier during a supervised training process.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present disclosure as described herein.

Satellite imagery has become a powerful tool used by governments and private institutions alike to collect images of earth and analyze those images for certain characteristics or properties that are of interest. For instance, satellite imagery has been used in such contexts as meteorology, fishing, agriculture, and even surveillance to quickly collect data over large swaths of land and analyze the images based on a criteria of interest. For instance, in the context of surveillance, satellite imagery has allowed for public and private entities to quickly survey large areas of land searching for aircraft, thus allowing an organization to take an inventory of the number of aircraft or the number of aircraft of a given type that are present in a particular geographic area. Conventionally, a human could manually review the images obtained by a satellite and search for aircraft in the images. However, such a manual process is a time-consuming endeavor, and can take many hours of human effort to review the numerous and voluminous number of images that can be acquired by a satellite.

Machine learning has become a tool used in many contexts to reduce the amount of human effort required to complete a task, including the review of satellite imagery. In one or more examples, a machine learning model or classifier can be created that can automatically receive a satellite image and determine whether the image includes a particular object such as an aircraft. Often times (and as described in detail below) a machine learning model or classifier can be generated using a supervised training process in which training images are annotated with labels identifying the objects in an image, which are then used to “teach” the classifier how to determine whether a particular image includes a particular object such as an aircraft. Training a classifier can require a large amount of training data in order to create a robust classifier. For instance, the training data should teach the classifier to identify an aircraft in a variety of contexts including different times of the day, different terrain conditions, and different types of aircraft. In order to build a robust classifier, the classifier should be provided with numerous examples/training data.

However, providing a machine learning classifier enough training examples can be a challenge when there may be a scarcity of natural training images available. For instance, in the context of using satellite imagery to identify aircraft, there may not be a large amount of training data available to train a classifier, since the presence of already identified aircraft in satellite imagery may be scarce. In addition to a scarcity of images, the process of annotating the available images in the aircraft context for use in a supervised training process can also present challenges. Annotation of satellite images for aircraft can be a strenuous and time-consuming effort where there are tremendous true negative rates across imagery. Thus, there is a need for the automatic creation of a significantly sized labeled dataset suitable to train machine learning models to detect the objects of interest (e.g., specific aircraft) in satellite imagery.

FIG. 1 illustrates an exemplary satellite image to be used for training a machine learning model according to examples of the disclosure. In one or more examples, the image 100 can be a satellite image of an aircraft “boneyard,” a location where aircraft are retired long term. Boneyards can be a good source of training images for a machine learning classifier since they contain a large number of aircraft in different orientations and of different types. In one or more examples, a boneyard image such as image 100 can be used to train a classifier. In one or more examples, the image 100 can be annotated to identify the type and location of each and every aircraft found in the image. For instance, in one or more examples, image 100 can include annotation 102 that identifies the portion of the image 100 in which a particular aircraft is found. In one or more examples, the annotation 102 can not only include the location of a particular aircraft, but can also include other information about the aircraft such as aircraft type and orientation of the aircraft.

Figure 2:
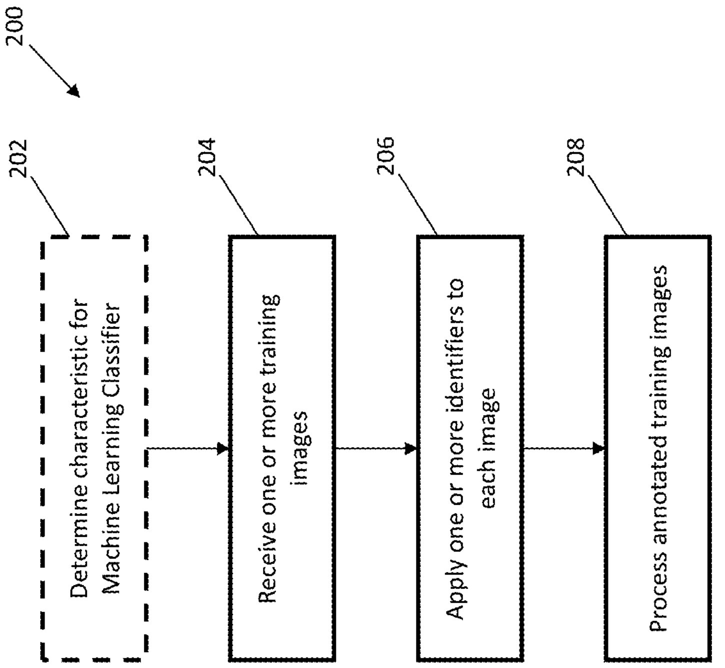
FIG. 2 illustrates an exemplary supervised training process for generating a machine learning model according to examples of the disclosure.

A boneyard satellite image, such as the image 100 with annotations 102 can be used as part of a supervised training process configured to train a classifier to automatically detect the presence of aircraft in a satellite image. FIG. 2 illustrates an exemplary supervised training process for generating a machine learning model according to examples of the disclosure. In the example of FIG. 2, the process 200 can begin at step 202 wherein a particular characteristic for a given binary machine learning classifier is selected or determined (such as the presence of an aircraft, aircraft type, orientation of an aircraft, etc.). In one or more examples, step 402 can be optional, as the selection of characteristics needed for the machine learning classifiers can be selected beforehand in a separate process.

Once the one or more characteristics to be classified have been determined at step 202, the process 200 can move to step 204 wherein one or more training images corresponding to the selected characteristics are received. In one or more examples, each training image can include one or more identifiers/annotations that identify the characteristics contained within an image. The identifiers can take the form of annotations that are appended to the metadata of the image, identifying what characteristics are contained within the image.

In one or more examples, if the training images received at step 204 do not include identifiers, then the process can move to step 206 wherein one or more identifiers are applied to each image of the one or more training images. In one or more examples, the training images can be annotated with identifiers using a variety of methods. For instance, in one or more examples, the training images can be manually applied by a human or humans who view each training image, determine what characteristics are contained within the image, and then annotate the image with the identifiers pertaining to those characteristics. Alternatively or additionally, the training images can be harvested from images that have been previously classified by a machine classifier. In this way, each of the machine learning classifiers can be constantly improved with new training data (i.e., by taking information from previously classified images) so as to improve the overall accuracy of the machine learning classifier.

In one or more examples, and in the case of segmentation or region based classifiers such as region-based convolutional neural networks (R-CNNs), the training images can be annotated on a pixel-by-pixel or regional basis to identify the specific pixels or regions of an image that contain specific characteristics. For instance in the case of R-CNNs, the annotations can take the form of bounding boxes or segmentations of the training images. Once each training image has one or more identifiers annotated to the image at step 206, the process 200 can move to step 208 wherein the one or more training images are processed by each of the machine learning classifiers in order to train the classifier. In one or more examples, and in the case of CNNs, processing the training images can include building the individual layers of the CNN.

In order for the process described above with respect to FIG. 2 to generate a machine learning classifier that is accurate in a variety of scenarios, a large number of training images are desired. However, obtaining satellite imagery of particular objects of interest can be a challenge since they may not naturally occur. For instance, with respect to aircraft, the number of aircraft boneyard images may be limited if the number of boneyards on the earth are limited. If a particular kind of aircraft is scarce, then finding sufficient training images to teach a classifier how to identify the aircraft can be challenging. This can be especially true when the most likely place to find a particular aircraft is in an aircraft boneyard, which may be scarce. Thus, in one or more examples, and in order to generate sufficient training images to build a robust and accurate machine learning classifier, one or more synthetic training images can be created for the purpose of providing a machine learning classifier/model sufficient training images. In one or more examples, a "synthetic" training image can refer to artificially generated satellite images that were not produced solely from a satellite taking images toward the earth. In one or more examples, and as described in detail below, generating synthetic image can include combining images of aircraft (derived from a variety of sources) with background terrain images in a manner that provides the machine learning classifier with realistic training data, and provides the machine learning classifier with a diversity of contexts/scenarios so as to ensure that the machine learning classifier is able to accurately classify satellite images over a broad array of contexts.

Figure 3:
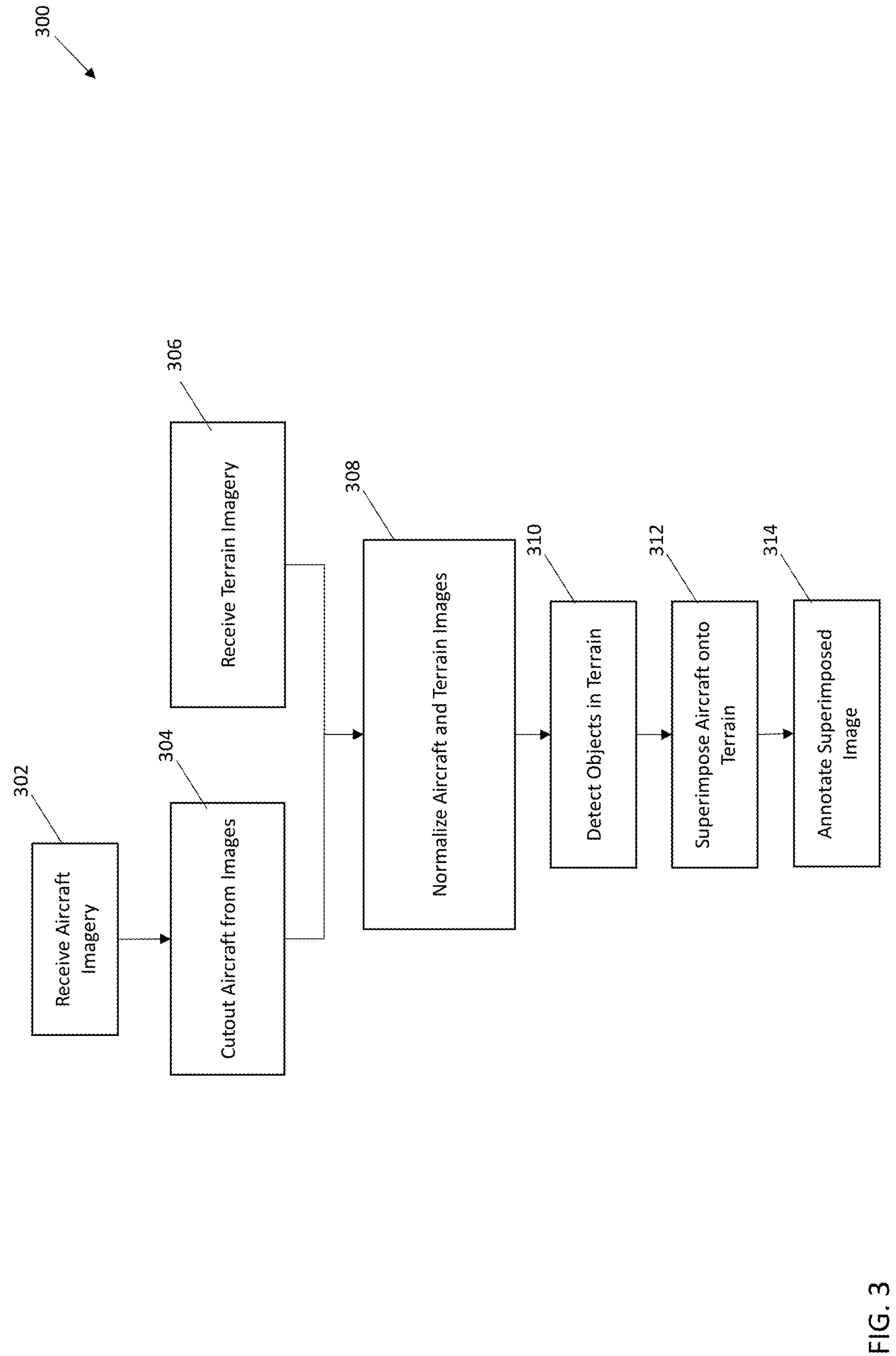
FIG. 3 illustrates an exemplary process for generating synthetic training images for a machine learning model according to examples of the disclosure.

FIG. 3 illustrates an exemplary process for generating synthetic training images for a machine learning model according to examples of the disclosure. In one or more examples, the process 300 of FIG. 3 can represent a process for generating one or more "synthetic" training images, by obtaining images of aircraft from a variety of sources (described in detail below) and superimposing the images on a plurality of background/terrain images in a manner that provides a machine learning classifier realistic training data (so as to not bias the classifier due to artifacts created by the generation of the synthetic images). In one or more examples, the synthetic images generated using the process 300 described in detail below also be automatically annotated as part of the process, so as to minimize or eliminate the need for human effort to manually annotate training images for the purpose of generating a machine learning classifier using a supervised training process.

In one or more examples, the process 300 of FIG. 3 can begin at step 302, wherein one or more images of aircraft are received. In one or more examples, the images received at step 302 can include overhead views of aircraft generated from a plurality of sources. For instance, in one or more examples, the overhead images of aircraft (i.e., the orientation the aircraft would be in on an image, if the image was obtained from a satellite) can be obtained from a variety of sources. In one or more examples, the images obtained at step 302 can include actual satellite images collected from satellite imagery from boneyards or other airfields. In one or more examples, the satellite images themselves can be used to train a machine learning classifier. Additionally or alternatively, in one or more examples, the satellite images of aircraft can be used as "seeds" to create a plurality of synthetic images. As explained in further detail below, in one or more examples, aircraft captured in a satellite image can be "cutout" and used to create a plurality of synthetic images. Thus, in one or more examples, a particular image taken from a satellite image, rather than simply creating a single training image, can be used to create multiple training images.

In one or more examples, the images received at step 302 can also come from non-satellite image sources. For instance, in one or more examples, the images received at step 302 can be obtained by building a scale model of a particular aircraft of interest (using a model kit for example) and painting the aircraft to look realistic (including weathering effects) and then taking aerial photography of the scale model (for instance by using a drone) to recreate a satellite image. Since the scale model will be much smaller than an actual real-life plane, a drone can be used to capture the overhead image, since the altitude needed to recreate the scale of a satellite image will be lower. Additionally or alternatively, in one or more examples, the images of the aircraft can be obtained using CAD models of an aircraft, which can be oriented so as to provide an overhead view of the aircraft (as would be the case in a naturally occurring satellite image). As described in detail below the aircraft included in the CAD models, scale models, or satellite images can each be used to generate multiple synthetic images, thus multiplying the number of training images that can created from a single image of an aircraft.

In one or more examples, once the aircraft images are received at step 302, the process 300 of FIG. 3 can move to step 304 wherein the aircraft contained within the images are "cutout" (i.e., segmented) from their corresponding original so that they can be placed on a variety of background images so as to create synthetic training images. In one or more examples, cutting out images from an image can be done manually by a human, however doing so could be a time-consuming process which could make the act of creating synthetic images a time-consuming and labor intensive process, thus making the process infeasible. Thus, in one or more examples, at step 304, the process of cutting out images of aircraft from the images received at step 302 can be carried out using an automated cutout creation pipeline. An automated cutout creation pipeline can include a process in which aircraft are segmented from the image received at step 302 with minimal or no human intervention, thus reducing the time and labor needed to generate synthetic training data.

Figure 4:
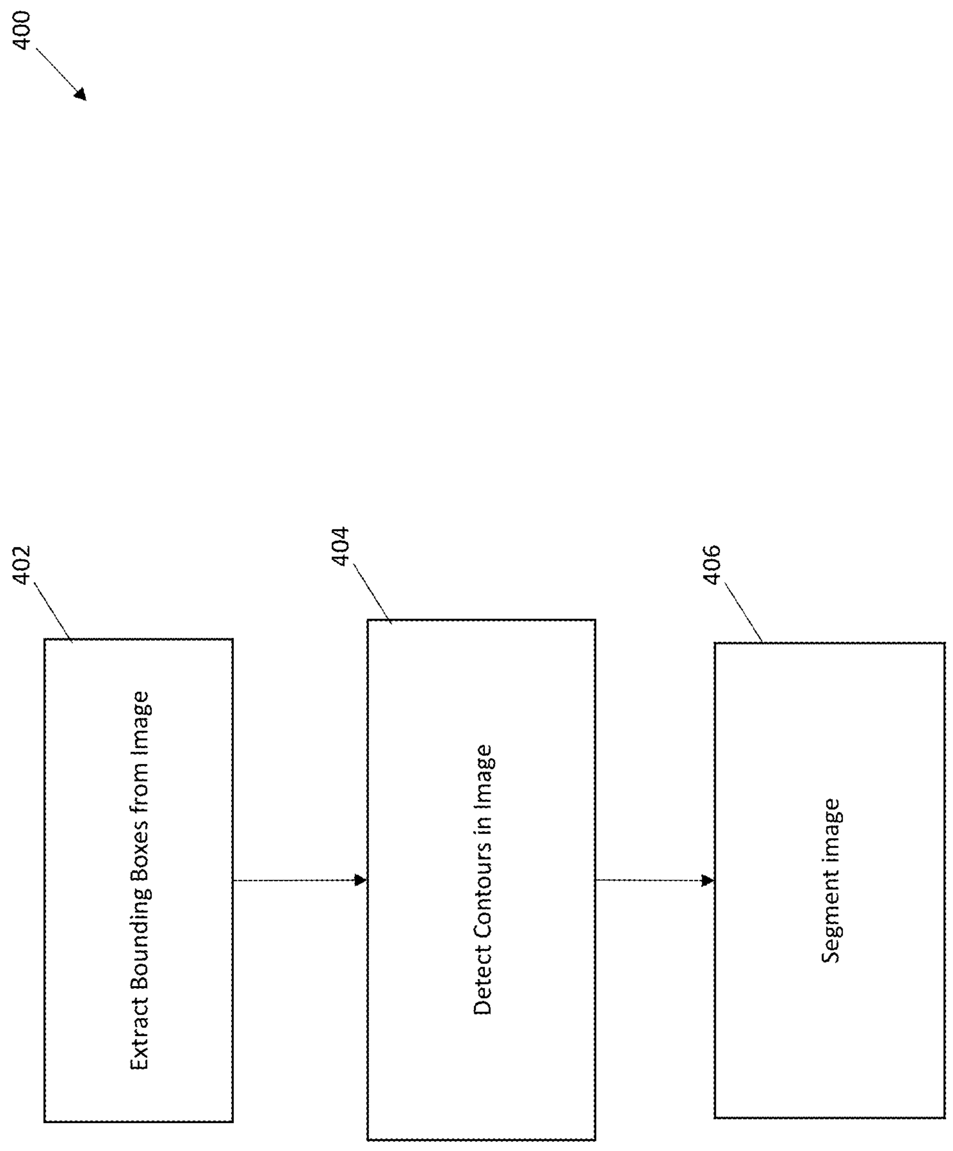
FIG. 4 illustrates an exemplary process for extracting objects from an image according to examples of the disclosure.

FIG. 4 illustrates an exemplary process for extracting objects from an image according to examples of the disclosure. In one or more examples, the process 400 of FIG. 4 can represent an exemplary process for receiving an image that includes one or more aircraft, and segmenting the aircraft from the image so that the image of the aircraft is cutout from the image and forms its own separate image. In one or more examples, the process 400 of FIG. 4 can begin at step 402, wherein a bounding box is identified from the image received at step 302 which contains the aircraft to be segmented. In one or more examples, the bounding box creation at step 302 can serve to eliminate large background objects and terrain by detecting the general location of the aircraft and cropping it out of the image.

In one or more examples, the bounding box created at step 302 can be generated by using greyscale pixel thresholding. In one or more examples, greyscale pixel thresholding can include going pixel-by-pixel through an image received at step 302 and setting pixels with values higher than a pre-determined threshold to the maximum value, while setting pixels with values lower than the pre-determined threshold to the minimum value possible (i.e., 0). In one or more examples, the threshold can be based on the average pixel values (i.e., brightness values) contained within the image. In one or more examples, since an aircraft in the photo will likely have the brightest pixels within the image, by thresholding the image, the likely location of the aircraft or aircrafts in a particular image can be determined. In one or more examples, and as many outdoor images may contain many lighting artifacts, additional processing of the thresholded images can take place as part of step 304 to reduce the probability that small clusters of bright pixels are errantly identified as likely belonging to an aircraft.

In one or more examples, and at step 402, once the image has been thresholded, a cluster of pixels identified as being above the pre-determined threshold can be identified, and a bounding box can be placed around the identified cluster. In one or more examples, once the bounding box has been placed on the image, the image can be cropped so that only the portion of the image within the bounding box remains. In one or more examples, the remaining image can be further analyzed (as described below) to determine the contours of the aircraft image which can form the basis of segmenting the image as described in further detail below.

In one or more examples, after the bounding box has been extracted at step 402, the process 400 can move to step 404, wherein in one or more contours in the remaining image are identified. In one or more examples, an assumption can be made that the aircraft would be the largest, centered contour in the image create at step 402, and thus in one or more examples, a second round of image thresholding (on the cropped image) can be performed and a contour extraction algorithm can be performed on the second round thresholded image. In one or more examples, the aircraft may occasionally be broken down by a contouring algorithm into multiple distinct off centered contours. Thus, in one or more examples, an assumption can be made that the contours belonging to the aircraft would be the closest to the center of the initial extraction (performed at step 402) and thus would have nearly no separation between each other in the cropped image. Thus, in one or more examples at step 404, contouring the aircraft can include first detecting the main body of the aircraft contour based on distance of a detected contour from the center of the image and then calculating the minimum distance of adjacent contours from the main aircraft contours and accepting any contours that are also connected to the center of the aircraft. Thus, in one or more examples, the separately detected contours can be combined into one overall contour, which can be used to create a tight-fitting crop of the aircraft from the background.

In one or more examples, once the contours of the aircraft have been identified at step 404, the process 400 can move to step 406 wherein automatic instance segmentation of the aircraft from the background in the image is performed. In one or more examples, segmentation of the aircraft from the background image can include setting all pixels of the cropped image outside of the identified contours (identified at step 404) to zero (a blank slate) with full transparency to allow the image of the aircraft to be used for superimposition work (discussed in further detail below). In one or more examples, the process 400 can include further processing of segmented images to include but not be limited to: (1) warping a close-fitting silhouette of the aircraft against the input image in order to extract the engine components completely from the background (warping may be needed as the off-nadir angle of the aircraft could vary from scene-to-scene, thus the silhouette may need to be adjusted to match; and (2) using machine learning image segmentation techniques.

In one or more examples, the process 400 of FIG. 4 can create a plurality of cut out images of aircraft, which as described in further detail below can be combined with exemplary background images to create a set of diverse and robust training images that can be used to train a machine learning classifier. Returning to the example of FIG. 3, in parallel to generating cutout images of aircraft at step 304, in one or more examples, the process 300 can also include receiving one or more background images at step 306. In one or more examples, background images can refer to images of terrain that does not include any aircraft of interest. In one or more examples, the aircraft images cutout at step 304 can be superimposed onto the terrain imagery received at step 306. Thus, in one or more examples, the background/terrain images received at step 306 can include a variety of contexts that in combination can present a diverse set of background images that reflect the many contexts in which an aircraft may appear in satellite imagery. For instance, in one or more examples, the background images received at step 306 can represent such terrains as cityscapes, rural areas, background covered in snow, backgrounds taken at various times of the days so as to reflect different lighting conditions, etc.

Figure 5:
FIG. 5 illustrates an exemplary aircraft cutout and background images according to examples of the disclosure.

In one or more examples, and at the conclusion of steps 304 and 306, the process 300 will now have (stored in a memory) a plurality of cutout aircraft and a plurality of background/terrain images. FIG. 5 illustrates an exemplary aircraft cutout and background images according to examples of the disclosure. In one or more examples, the aircraft cutout 502 exemplifies the output of the step 304 of process 300 of FIG. 3. Thus, in one or more examples, aircraft cutout 502 can exemplify the image of an aircraft which has had its contours identified and the portions of the image not within the contours zeroed out (i.e., made white and/or transparent). In one or more examples, background image 504 can represent an exemplary image. As illustrated, background image 504 can be a satellite image taken from a satellite, in which aircraft may or may not be present, but can nonetheless be used as a background to place the cutout 502 onto to create a synthetic training image.

In one or more examples, the two sets of images (i.e., the aircraft cutout and the background image) may need to be "normalized" to one another so as to ensure that the superimposition process (described in detail below), in which the aircraft cutout is placed on a background image, results in a synthetic image that is indistinguishable from a real-world satellite image of an aircraft. Normalization can refer to the process of harmonizing the two images (the aircraft and the background) so that both images have consistency in resolution and color-mapping. The purpose of normalizing the images to one another is to ensure that the two images when superimposed on top of one another will appear as if they were both part of the same image rather than one image placed on top of the other. Successful superimposition can minimize the likelihood that the synthetic images will bias the machine learning classifier to look for certain artifacts in the training image to determine the location of an aircraft in the synthetic image.

Figure 6:
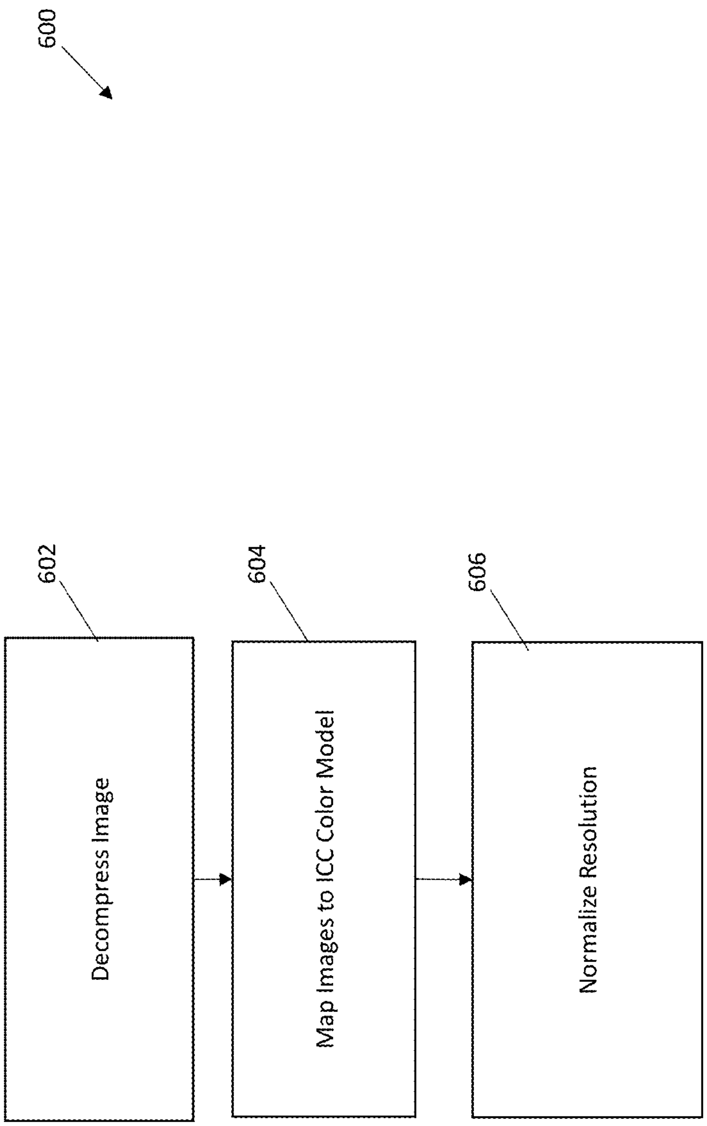
FIG. 6 illustrates an exemplary process for normalizing an object image and a background image according to examples of the disclosure.

FIG. 6 illustrates an exemplary process for normalizing an object image and a background image according to examples of the disclosure. In one or more examples, the process 600, can begin at step 602 wherein both the aircraft cutout as well as the background image are decompressed. In one or more examples, decompression can refer to the process of decoding or undoing any error correction or data compression algorithms that were performed on the original images, so as to convert the images into a format that at least closely resembles the uncompressed raw format in which the images were acquired. In many instances, a satellite image or other images have compressing applied to them so as to reduce their cost for storage or transmission. In one or more instances, the compression can take many forms such as various methods for lossy compression or lossless compression. Thus, in one or more examples, it can be possible that the background image and the aircraft cutout could have been compressed using different algorithms and techniques. Thus, in order to ensure a successful superimposition of the two images, both images can be decompressed to ensure that they are in the same format or similar formats to promote superimposition of the two images.

In one or more examples, once the two images have been decompressed at step 602, the process 600 can move to step 604 wherein both the images of the aircraft and the background undergo a color mapping process in which each pixel of each image is characterized according to a common color space such as the standards promulgated by the International Color Consortium (ICC). In one or more examples, step 604 can include mapping the colors found in each image to a common color palette (i.e., map). Step 604 thus ensures that the colors found in each of the aircraft image and the background image are mapped to the same color model (i.e., the ICC model). In one or more examples, mapping both the background image and the aircraft image to the same color map at step 604 can help to ensure that any blending done as part of the superimposition process (described in further detail below) will be effective in masking the fact that the aircraft image and the background image were derived from two different sources.

In one or more examples, once the background and aircraft images undergo color mapping at step 604, the process 600 can move to step 606 wherein both images undergo resolution normalization. In one or more examples, image normalization can include converting both the background image and the aircraft image (which may be different size scales from one another) to a common size (i.e., a specific image resolution). Converting both the aircraft image and the background images to a common resolution can further help to ensure that the superimposition process yields a realistic (albeit synthetic) satellite image of an aircraft.

Returning to the example of FIG. 3, once the normalization processes have been performed on both the aircraft image and the terrain image at step 308, the process 300 can move to step 310 wherein objects in the terrain image are detected. In one or more examples, the random placement of aircraft into satellite imagery may result in aircraft that are situated in implausible locations on a background terrain image. For instance, if a background image includes a tree in the image, it would not be realistic to superimpose the aircraft onto the tree, since that is not a place one would find a plane in a satellite image. Furthermore, randomly placing an aircraft onto a background image may not be biased to the most likely places for the aircraft to appear in a given scene. Therefore, in one or more examples, step 310 can include applying methods to create candidate areas in the scene where aircraft can and cannot be placed so as to generating convincing synthetic satellite imagery. In one or more examples, object detection in the background images can be performed by applying one or more machine learning classifiers to the background image. In one or more examples, the machine learning classifiers (using a supervised training process) can be configured to detect various objects in a background images such as buildings, trees, bodies of water etc., (i.e., places where it would not make sense to place an aircraft). Thus in one or more examples, the one or more machine learning classifiers could be collectively configured to detect objects in the image and place "exclusion zones" in the images by identifying areas of the background image where an aircraft should not be placed when generating a synthetic training image.

In one or more examples, and additionally or alternative, other methods outside of applying machine learning can be applied to a background image to determine the location of objects in the image for the purpose of avoiding placing an aircraft cutout in the identified location. For instance, various computer vision techniques can be employed to distinguish or identify objects in a background image. In one or more examples, if the goal is to place an aircraft on a place in an image that is sufficiently large to hold it without obstructions, then an object detection algorithm should be able to determine ranges of pixels within a background image that: (1) has a height and width greater than a given aircraft cutout (at any rotation of the aircraft); (2) does not contain any obstructions; and (3) does not overlap with any obstructions. To achieve the second and third objectives, in one or more examples a process known as thresholding which can be adapted for the tasks described above can be employed to detect objects in an image.

In one or more examples thresholding entails a process in which if image intensity exceeds some threshold, the pixel is made white and otherwise black. In the case of background images for synthetic training images, it is uncertain whether higher or lower intensity images represent obstructions vs. terrain (locations without an obstruction). Instead, in one or more examples, the following assumption can made: The background terrain is more common than the individual obstructions in an image. From this assumption, it can be reasonable to assume that the average color of a pixel in a particular background scene can be closer to the terrain than to its obstructions. Therefore, in one or more examples pixels within a background image that deviate beyond a certain pre-determined threshold from an average pixel intensity (in the red, blue, and green channels) can be assumed to represent an object rather than a piece of the terrain upon which an aircraft can be placed.

Figure 7:
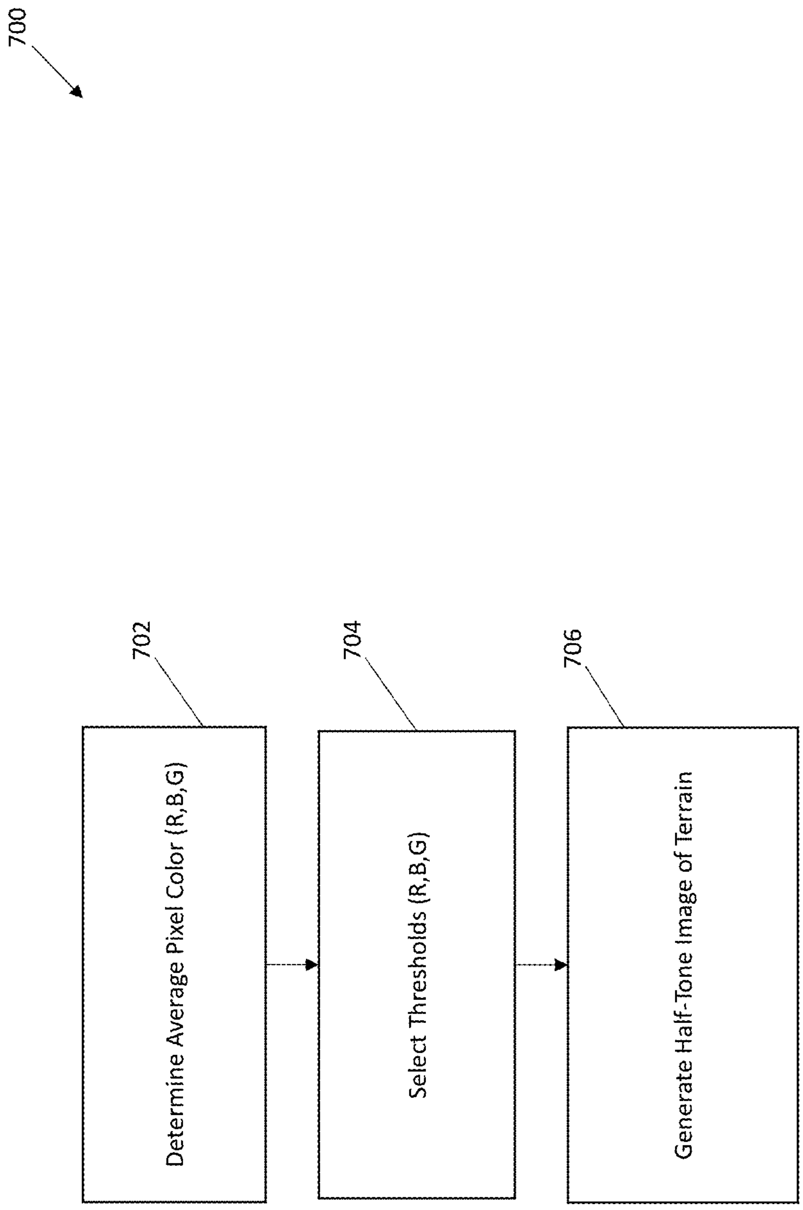
FIG. 7 illustrates an exemplary process for thresholding of background images according to examples of the disclosure.

FIG. 7 illustrates an exemplary process for thresholding of background images according to examples of the disclosure. In one or more examples, the process 700 can begin at step 702, wherein each pixel of a background image is analyzed to determine an average pixel color (R,B,G) of the image. In one or more examples, determining the average pixel can simply refer to adding up each of the red values, each of the blue value, and each of the green values, and dividing the sum by the total number of pixels to generate an average. Using the assumption that the portions of the image associated with terrain (i.e., where an aircraft can be placed), determining what the average pixel value for each color channel can thus set an expected value for a pixel associated with a terrain, meaning that any deviations beyond a threshold from the expected value is likely to be associated with an object in the background image in which placing an aircraft on should be avoided.

In one or more examples, once the average pixel color for each color channel (R,B,G) is determined at step 702, the process 700 can move to step 704 wherein one or more thresholds are selected based on the average calculated at step 702. In one or more examples, the thresholds can be chosen for red, green, and blue (θR, θB, and θG) such that for the average color (μR, μG, and μB) and any given pixel p with red, green, and blue color values pR, pG, and pB, the following transformation is performed:

if (μR−θR≤pR≤μR+θR)

and (μG−θG≤pG≤μG+θG)

and (μB−θB≤pB≤μB+θB)

Then: Black; Else: White

In the above transformation any pixels that are within the selected threshold distance from the mean pixel will be converted to black, while any pixel outside of the threshold distance from the mean will be converted to white. In one or more examples, the thresholds can be selected empirically or chosen through any method that can yield an acceptable probability of success in detecting objects within an aircraft. In one or more examples, the "white" pixels can be identified as areas in a photo over which an aircraft may not be placed. Thus, once the thresholds have been selected at step 704, the process can move to step 706 wherein a "half-tone" image of the terrain/background image can be created using the transformation presented above along with the thresholds determined at step 702.

Figure 8:
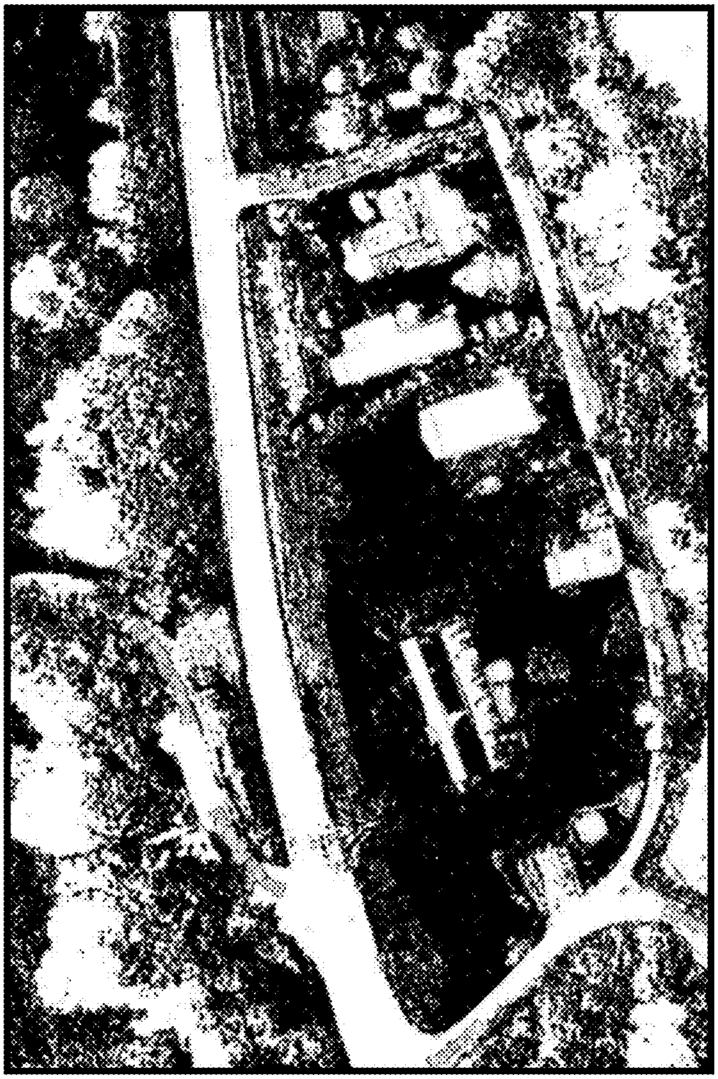
FIG. 8 illustrates an exemplary thresholded image according to examples of the disclosure.

FIG. 8 illustrates an exemplary half-tone image according to examples of the disclosure. In the example of FIG. 8, image 800 can represent a half-tone image generated using the process 700 described above with respect to FIG. 7. In one or more examples, the image 800 can include white portions (representing detected objects in an image) and black portions (representing terrain). In one or more examples, and as described in further detail below, an aircraft cutout can be superimposed on a portion of a background image corresponding to a black portion of the half-tone image that is large enough to contain the aircraft to superimposed on the image.

Returning to the example of FIG. 3, once the objects have been detected in the terrain images at step 310, then in one or more examples, the process 300 can move to step 312 wherein the aircraft cutout is superimposed onto the background/terrain image. In one or more examples, superimposing the aircraft cutout onto the background image can include finding a suitable location within a background image to place the cutout (using the results of the object detection process described above), and then blending the cutout and the background image to form a synthetic image.

Figure 9:
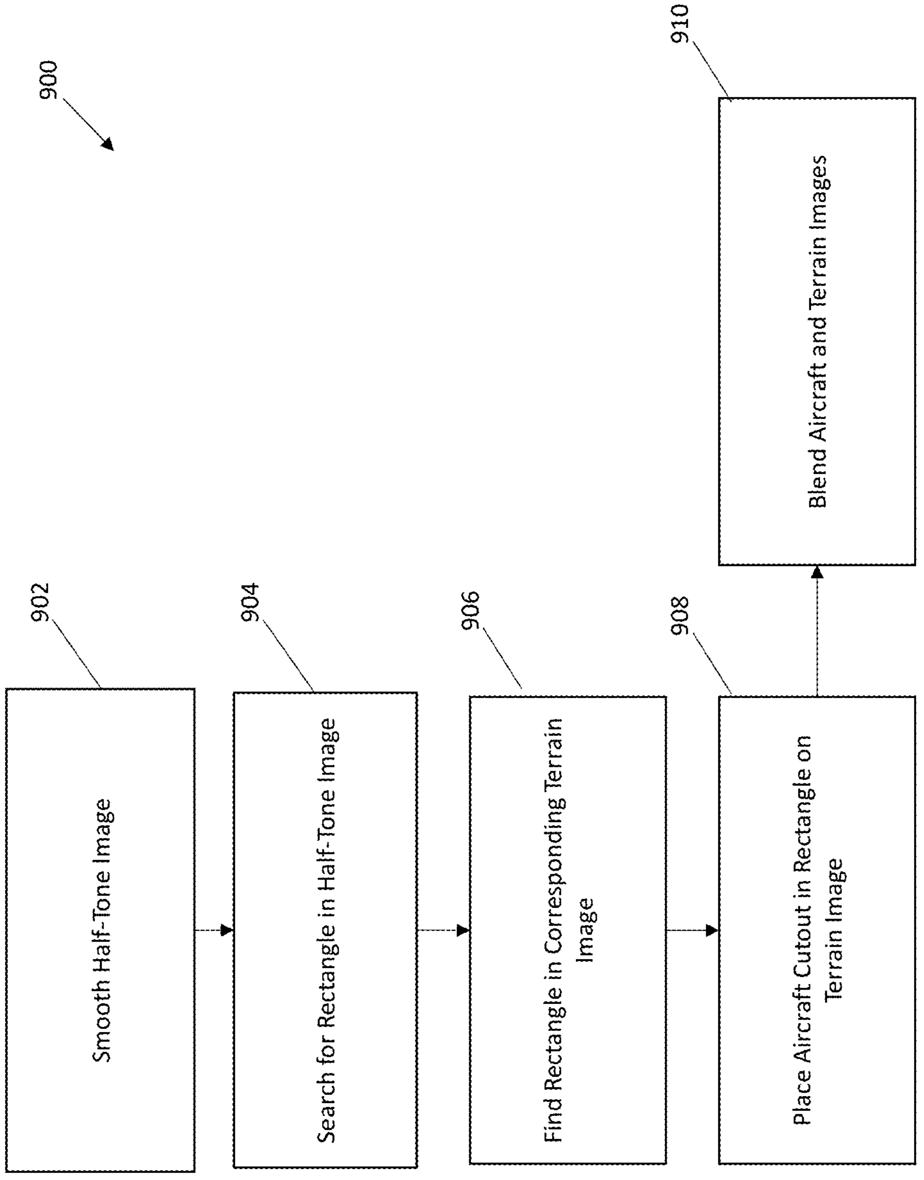
FIG. 9 illustrates an exemplary process for superimposing an object onto a background image for generate a synthetic training imaging according to examples of the disclosure.

FIG. 9 illustrates an exemplary process for superimposing an object onto a background image for generate a synthetic training imaging according to examples of the disclosure. In one or more examples of the disclosure, the process 900 can begin at step 902 wherein the half-tone image generated by process 700 of FIG. 7 can be smoothed to remove small clusters of white pixels that are more likely to be noise than objects from the half-tone image. In one or more examples, the half-tone image produced in the example process 700 of FIG. 7 may include stray white pixels that deviate from the pixels immediately surround them. These stray pixels are not likely actual obstructions (just as stray black pixels are not likely part of the terrain), and thus they may be removed in order to improve the accuracy of using the half-tone image to determine where to superimpose an aircraft cutout onto a background image. In one or more examples, a greedy method can be applied to a generated half-tone image that makes areas that are predominantly black or white more uniform. In one or more examples, the greedy method can include dividing the image into a plurality of square segments and if the number of black pixels falls below a certain threshold they can be set to white, and if the number of white pixels falls below a certain threshold they can be set to black. In this way, the smoothing can increase the available area of a background image to place an aircraft whereas without smoothing an area of a background image may have been excluded due to errant objects detected in the image.

In one or more examples, once the half-tone image is smoothed at step 902 the process 900 can move to step 904 wherein the half-tone image is searched to find a rectangle (i.e., area) on the image where an aircraft can be placed on top of and superimposed. In one or more examples, step 904 can include searching for the largest black rectangle in the half-tone image to use as a candidate location for placing the aircraft. In one or more examples, searching for the rectangle at step 902 can include selecting a random pixel location on the half-tone image and for each random location, a rectangle can be grown from that position in all four directions (up, down, left, and right) where the direction is chosen randomly until a white pixel is encountered on each border. In one or more examples, the above process can ensure that the largest black rectangle possible is found. In one or more examples, the largest rectangle encountered over many samples can be retained as the candidate location where the aircraft cutout will be placed.

In one or more examples, once the rectangle has been found in the half-tone image at step 904, the process 900 can move to step 906 wherein the portion of the background image corresponding to the half-tone image can be identified. As described above, the half-tone image can be generated and used for the purpose of identifying areas of the background image to avoid placing aircraft, and for finding a suitable area in the background image where an aircraft cutout can be placed. Thus, the areas identified in the half-tone image can be correlated with the background image used to generate the half-tone image, so that the corresponding locations/objects in the background image can be avoided, and the identified rectangle for aircraft placement can be identified for placement of the aircraft cutout.

In one or more examples, once the rectangle identified in the half-tone image is identified in the corresponding background image at step 906, the process 900 can move to step 908 wherein the aircraft cutout is place on the rectangle in the terrain image. In one or more examples, placing the aircraft cutout can include rotating the cutout image and placing it into the rectangle image that can contain it. In one or more examples, if the rectangle identified in the satellite image is not sufficiently large to place the aircraft's rectangle, then in one or more examples, the aircraft will not be placed. In the event that the aircraft fits into the identified rectangle, then in one or more examples, the aircraft is placed in the rectangle.

Once the aircraft has been placed at step 908, the process 900 can move to step 910 wherein the aircraft cutout placed on the background image is blended onto the background image so as to create a realistic synthetic satellite image that can be used to train a machine learning classifier. In one or more examples, a variety of blending techniques can be used to superimpose the aircraft cutout onto the background in manner that does not bias or distort the training process. While the approach of placing cut-outs on backgrounds may suffice to train a machine learning based classifier, unmodified images of these aircraft (i.e., when they aren't blended with the background image they are placed on) tend to be too similar and can lead to overfitting in training process for the machine learning classifier. Additionally, aircraft cut-outs may starkly stand out against their backgrounds and cause downstream learning to be more attuned to the differences in the image quality than the presence of an aircraft.

Thus, in one or more examples, and at step 910, the aircraft cutout can be blended onto its background image to complete the superimposition process. In one or more examples, blending can include applying a decoding auto-encoder (DAE) in order to smooth the aircraft image onto the background image. Auto-encoders can be used to perform dimensionality reduction of high-dimensional input. Specifically, auto-encoders can take form of neural networks trained on data in the input and output layer, which can be considered original data and a reconstruction respectively. In one or more examples, the dimensions of the network's hidden layers can be smaller than the inputs so they can be naturally lossy and allow for a compressed representation. In one or more examples, after the auto encoder has been trained, the learned weight of the encoder can be able to reconstruct an approximation of the original content as closely as possible.

In one or more examples, a DAE can stochastically corrupt the input (i.e., an image) but can still use the original input for reconstruction. Often times DAEs have been applied to context with missing data values. In one or more examples, the sharp divisions (i.e., abrupt transitions) between a cutout and the background image (once the cutout is placed on the image) can represent missing information that can be "filled in" by a DAE so as to blend the two images. In one or more examples, for the purpose of blending the cutout image with the background image, the DAE can receive an image to be blended at its input and perform dimensionality reduction operations, using the loss function to perform a smoothing effect on images. After each epoch in time (when the DAE is acting on the image), the image can gradually lose pixel sharpness allowing for pixels bordering the cutout and the background to appear as if they were from a single image.

In one or more examples, using a single image blending technique for aircraft superimposition can create a risk of image artifact biases in the synthetic training data. In one or more examples, the presence of these biases could result in machine learning classifiers/models looking for inconsistent lighting, edges, or other unrealistic image features to determine the presence of an aircraft in a synthetic training image. Thus, in one or more examples, in order to avoid creating these biases, a diverse set of blending techniques can applied to a corpus of training images so as to avoid biasing the machine learning classifiers during the supervised training process. In one or more examples, as each blending technique will contain a different set of image inconsistencies/artifacts, the overall effect caused by using a diverse set of techniques will be that the classifier will not use image artifacts caused by process for generating the synthetic images as a basis for classification. In one or more examples, the blending techniques can include using DAEs as discussed above, but can also include using background color blending, alpha channel blending, combined alpha and background color blending, white balancing, edge and full image blurring and sharpening, sRGB color linearization, and other blending technique designed to blend two images together. In one or more examples, using the techniques at random when generating synthetic training data can lead to an overall improved accuracy in the machine learning classifier by eliminating biases caused by synthetic data generation process.

Returning to the example of FIG. 3, once the aircraft cutout image has been superimposed onto the background image at step 312, the process can move to step 314 wherein the synthetic training image is automatically annotated with the location of the aircraft in the image for the purpose of providing the information to the supervised training process. In one or more examples, annotating the training image can include indicating a location of a bounding box where the aircraft is located (for instance by appending the information to the metadata of the image) so that during the supervised training process, the machine learning classifier can learn from the image by knowing where the aircraft in the image being used to train the classifier is located. In this way, in addition to multiplying the amount of training data available to train a machine learning classifier, the process 300 can also reduce the amount of effort required to annotate a training data set.

The systems and methods described above can be used to generate a robust training data set for use in a supervised training process. The aircraft cutouts and background images used to generate the synthetic training data set can be selected to reflect different contexts (i.e., lighting, terrain conditions, environments) thereby making the machine learning classifier more robust and accurate in a variety of contexts. The description of the systems and methods described above have been made using the example of detecting aircraft in satellite images, but the example should not be seen as limited to this context. In one or more examples, the above disclosure can be applied to other object or characteristic identification in images using machine learning classifiers, as would be appreciated by a person of skill in the art.

Figure 10:
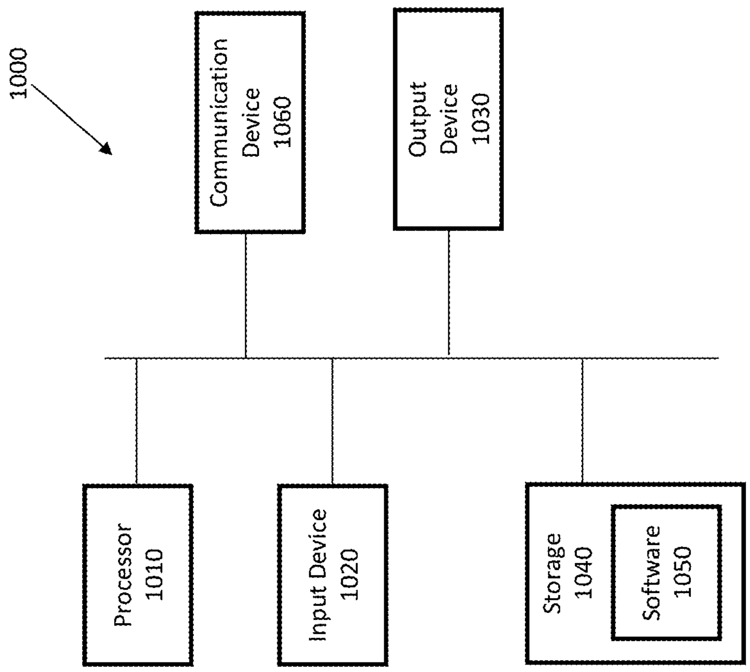
FIG. 10 illustrates an exemplary computing system, according to examples of the disclosure.

FIG. 10 illustrates an example of a computing system 1000, in accordance with some examples of the disclosure. System 1000 can be a client or a server. As shown in FIG. 10, system 1000 can be any suitable type of processor-based system, such as a personal computer, workstation, server, handheld computing device (portable electronic device) such as a phone or tablet, or dedicated device. The system 1000 can include, for example, one or more of input device 1020, output device 1030, one or more processors 1010, storage 1040, and communication device 1060. Input device 1020 and output device 1030 can generally correspond to those described above and can either be connectable or integrated with the computer.

Input device 1020 can be any suitable device that provides input, such as a touch screen, keyboard or keypad, mouse, gesture recognition component of a virtual/augmented reality system, or voice-recognition device. Output device 1030 can be or include any suitable device that provides output, such as a display, touch screen, haptics device, virtual/augmented reality display, or speaker.

Storage 1040 can be any suitable device that provides storage, such as an electrical, magnetic, or optical memory including a RAM, cache, hard drive, removable storage disk, or other non-transitory computer readable medium. Communication device 1060 can include any suitable device capable of transmitting and receiving signals over a network, such as a network interface chip or device. The components of the computing system 1000 can be connected in any suitable manner, such as via a physical bus or wirelessly.

Processor(s) 1010 can be any suitable processor or combination of processors, including any of, or any combination of, a central processing unit (CPU), field programmable gate array (FPGA), and application-specific integrated circuit (ASIC). Software 1050, which can be stored in storage 1040 and executed by one or more processors 1010, can include, for example, the programming that embodies the functionality or portions of the functionality of the present disclosure (e.g., as embodied in the devices as described above)

Software 1050 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1040, that can contain or store programming for use by or in connection with an instruction execution system, apparatus, or device.

Software 1050 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport computer readable medium can include, but is not limited to, an electronic, magnetic, optical, electromagnetic, or infrared wired or wireless propagation medium.

System 1000 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 1000 can implement any operating system suitable for operating on the network. Software 1050 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated. For the purpose of clarity and a concise description, features are described herein as part of the same or separate embodiments; however, it will be appreciated that the scope of the disclosure includes embodiments having combinations of all or some of the features described.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method for generating synthetic training images configured to train a machine learning classifier to detect a presence of one or more objects in an image, the method comprising:

receiving a plurality of object images, wherein each object image of the plurality of object images comprises an object to be identified by the machine learning classifier;

segmenting the image of the object from each object image of the plurality of object images to generate a plurality of cutout object images;

receiving a plurality of background images;

normalizing a first cutout object image of the plurality of cutout object images and a first background image of the plurality of background images;

determining a placement area of the first background image to place the first cutout object image upon at least in part by identifying a region of the background image that is suitable for realistic placement of the cutout object image;

superimposing the first cutout object image onto the determined placement area of the first background image to generate a first synthetic training image; and annotating the generated first synthetic training image with a location of the superimposed first cutout object image on the generated synthetic training image.

2. The method of claim 1, wherein segmenting the image of the object from each object image of the plurality of object images comprises:

cropping each object image to remove a portion of the object image in which the image of the object is not found;

detecting one or more contours in the cropped image; and segmenting the cropped image based on the detected one or more contours.

3. The method of claim 2, wherein detecting the one or more contours in the cropped image comprises determining an area of the cropped image that are outside the detected one or more contours, and modifying one or more pixels within the determined area of the cropped image that are outside the detected one or more contours so that they appear to be transparent.

4. The method of claim 1, wherein normalizing the first cutout object image of the plurality of cutout object images and the first background image of the plurality of background image comprises mapping the first cutout object image of the plurality of cutout object images and the first background image of the plurality of background images to a common color map.

5. The method of claim 1, wherein normalizing the first cutout object image of the plurality of cutout object images and the first background image of the plurality of background image comprises normalizing a resolution of the first cutout object image and normalizing a resolution of the first background image to a common image resolution.

6. The method of claim 1, wherein determining the placement area of the first background image to place the first cutout object image upon comprises generating a half-tone representation of the first background image.

7. The method of claim 6, wherein generating the half-tone representation of the first background image comprises:

determining an average pixel value of the background image;

selecting one or more pre-determined thresholds based on the determined average pixel value of the background image; and setting a pixel value of the background image to a first value or a second value based on a relationship between the pixel value and the selected one or more pre-determined thresholds.

8. The method of claim 7, wherein determining the placement area of the first background image comprises determining a location of one or more groups of pixels in the half-tone representation large enough to accommodate a size of the first cutout object image.

9. The method of claim 1, wherein superimposing the first cutout object image onto the determined placement area of the first background image to generate the first synthetic training image comprises blending the first cutout object image with the background image at the determined placement area to generate the first synthetic training image.

10. The method of claim 9, wherein blending the first cutout object image with the background image comprises applying one or more blending techniques selected from the group consisting of: alpha channel blending, color channel blending, white balancing, and edge blurring.

11. The method of claim 10, wherein the method comprises:

generating a second synthetic training image from a second cutout object image and a second background image; and applying a blending technique to the second synthetic training image that is different than the blending technique applied to the first synthetic training image.

12. A system for generating synthetic training images configured to train a machine learning classifier to detect a presence of one or more objects in an image, the system comprising:

a memory; and one or more processors;

wherein the memory stores one or more programs that when executed by the one or more processors, cause the one or more processors to:

receive a plurality of object images, wherein each object image of the plurality of object images comprises an object to be identified by the machine learning classifier;

segment the image of the object from each object image of the plurality of object images to generate a plurality of cutout object images;

receive a plurality of background images;

normalize a first cutout object image of the plurality of cutout object images and a first background image of the plurality of background images;

determine a placement area of the first background image to place the first cutout object image upon at least in part by identifying a region of the background image that is suitable for realistic placement of the cutout object image;

superimpose the first cutout object image onto the determined placement area of the first background image to generate a first synthetic training image; and annotate the generated first synthetic training image with a location of the superimposed first cutout object image on the generated synthetic training image.

13. The system of claim 12, wherein segmenting the image of the object from each object image of the plurality of object images comprises:

cropping each object image to remove a portion of the object image in which the image of the object is not found;

detecting one or more contours in the cropped image; and segmenting the cropped image based on the detected one or more contours.

14. The system of claim 13, wherein detecting one or more contours in the cropped image comprises determining an area of the cropped image that are outside the detected one or more contours, and modifying one or more pixels within the determined area of the cropped image that are outside the detected one or more contours so that they appear to be transparent.

15. The system of claim 14, wherein normalizing the first cutout object image of the plurality of cutout object images and the first background image of the plurality of background image comprises mapping the first cutout object image of the plurality of cutout object images and the first background image of the plurality of background images to a common color map.

16. The system of claim 12, wherein normalizing the first cutout object image of the plurality of cutout object images and the first background image of the plurality of background image comprises normalizing a resolution of the first cutout object image and normalizing a resolution of the first background image to a common image resolution.

17. The system of claim 12, wherein determining the placement area of the first background image to place the first cutout object image upon comprises generating a half-tone representation of the first background image.

18. The system of claim 17, wherein generating half-tone representation of the first background image comprises:

determining an average pixel value of the background image;

selecting one or more pre-determined thresholds based on the determined average pixel value of the background image; and setting a pixel value of the background image to a first value or a second value based on a relationship between the pixel value and the selecting one or more pre-determined thresholds.

19. The system of claim 18, wherein determining the placement area of the first background image comprises determining a location of one or more groups of pixels in the half-tone representation large enough to accommodate a size of the first cutout object image.

20. The system of claim 12, wherein superimposing the first cutout object image onto the determined placement area of the first background image to generate the first synthetic training image comprises blending the first cutout object image with the background image at the determined placement area to generate the first synthetic training image.

21. The system of claim 20, wherein blending the first cutout object image with the background image comprises applying one or more blending techniques selected from the group consisting of: alpha channel blending, color channel blending, white balancing, and edge blurring.

22. The system of claim 21, wherein the one or more processors are caused to:

generate a second synthetic training image from a second cutout object image and a second background image; and apply a blending technique to the second synthetic training image that is different than the blending technique applied to the first synthetic training image.

23. A non-transitory computer readable storage medium storing one or more programs for generating synthetic training images configured to train a machine learning classifier to detect a presence of one or more objects in an image, the programs for execution by one or more processors of an electronic device that when executed by the device, cause the device to:

receive a plurality of object images, wherein each object image of the plurality of object images comprises an object to be identified by the machine learning classifier;

segment the image of the object from each object image of the plurality of object images to generate a plurality of cutout object images;

receive a plurality of background images;

normalizing a first cutout object image of the plurality of cutout object images and a first background image of the plurality of background images;

determine a placement area of the first background image to place the first cutout object image upon at least in part by identifying a region of the background image that is suitable for realistic placement of the cutout object image;

superimpose the first cutout object image onto the determined placement area of the first background image to generate a first synthetic training image; and annotate the generated first synthetic training image with a location of the superimposed first cutout object image on the generated synthetic training image.

24. The non-transitory computer readable storage medium of claim 23, wherein segmenting the image of the object from each object image of the plurality of object images comprises:

cropping each object image to remove a portion of the object image in which the image of the object is not found;

detecting one or more contours in the cropped image; and segmenting the cropped image based on the detected one or more contours.

25. The non-transitory computer readable storage medium of claim 24, wherein detecting the one or more contours in the cropped image comprises determining an area of the cropped image that are outside the detected one or more contours, and modifying one or more pixels within the determined area of the cropped image that are outside the detected one or more contours so that they appear to be transparent.

26. The non-transitory computer readable storage medium of claim 25, wherein normalizing the first cutout object image of the plurality of cutout object images and the first background image of the plurality of background image comprises mapping the first cutout object image of the plurality of cutout object images and the first background image of the plurality of background images to a common color map.

27. The non-transitory computer readable storage medium of claim 23, wherein normalizing the first cutout object image of the plurality of cutout object images and the first background image of the plurality of background image comprises normalizing a resolution of the first cutout object image and normalizing a resolution of the first background image to a common image resolution.

28. The non-transitory computer readable storage medium of claim 23, wherein determining the placement area of the first background image to place the first cutout object image upon comprises generating a half-tone representation of the first background image.

29. The non-transitory computer readable storage medium of claim 28, wherein generating the half-tone representation of the first background image comprises:

determining an average pixel value of the background image;

selecting one or more pre-determined thresholds based on the determined average pixel value of the background image; and setting a pixel value of the background image to a first value or a second value based on a relationship between the pixel value and the selecting one or more pre-determined thresholds.

30. The non-transitory computer readable storage medium of claim 29, wherein determining the placement area of the first background image comprises determining a location of one or more groups of pixels in the half-tone representation large enough to accommodate a size of the first cutout object image.

31. The non-transitory computer readable storage medium of claim 23, wherein superimposing the first cutout object image onto the determined placement area of the first background image to generate the first synthetic training image comprises blending the first cutout object image with the background image at the determined placement area to generate the first synthetic training image.

32. The non-transitory computer readable storage medium of claim 31, wherein blending the first cutout object image with the background image comprises applying one or more blending techniques selected from the group consisting of: alpha channel blending, color channel blending, white balancing, and edge blurring.

33. The non-transitory computer readable storage medium of claim 32, wherein the one or more processors are caused to:

generate a second synthetic training image from a second cutout object image and a second background image; and apply a blending technique to the second synthetic training image that is different than the blending technique applied to the first synthetic training image.

34. The method of claim 1, wherein identifying the region of the background image that is suitable for realistic placement of the cutout object image comprises:

detecting one or more objects depicted in the first background image; and determining one or more areas in the first background image where the first cutout object image should not be placed based at least in part on the detected one or more objects.

35. The system of claim 12, wherein identifying the region of the background image that is suitable for realistic placement of the cutout object image comprises:

detecting one or more objects depicted in the first background image; and determining one or more areas in the first background image where the first cutout object image should not be placed based at least in part on the detected one or more objects.

36. The non-transitory computer readable storage medium of claim 23, wherein identifying the region of the background image that is suitable for realistic placement of the cutout object image comprises:

detecting one or more objects depicted in the first background image; and determining one or more areas in the first background image where the first cutout object image should not be placed based at least in part on the detected one or more objects.

* * * * *